United States Patent
Zhang

(10) Patent No.: US 10,257,777 B2
(45) Date of Patent: *Apr. 9, 2019

(54) SYSTEM AND METHOD FOR VIRTUAL USER-SPECIFIC SERVICE GATEWAYS

(71) Applicant: Huawei Technologies Co., Ltd., Shenzhen (CN)

(72) Inventor: Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,569

(22) Filed: Mar. 7, 2018

(65) Prior Publication Data

US 2018/0199276 A1    Jul. 12, 2018

Related U.S. Application Data

(63) Continuation of application No. 14/464,571, filed on Aug. 20, 2014, now Pat. No. 9,924,455.

(60) Provisional application No. 61/877,119, filed on Sep. 12, 2013.

(51) Int. Cl.
| | |
|---|---|
| *H04W 48/00* | (2009.01) |
| *H04W 88/16* | (2009.01) |
| *H04W 8/18* | (2009.01) |
| *H04W 8/22* | (2009.01) |

(52) U.S. Cl.
CPC .............. *H04W 48/17* (2013.01); *H04W 8/18* (2013.01); *H04W 8/22* (2013.01); *H04W 88/16* (2013.01)

(58) Field of Classification Search
CPC ......... H04W 48/17; H04W 8/18; H04W 8/22; H04W 88/16
See application file for complete search history.

(56) References Cited

U.S. PATENT DOCUMENTS

| | | |
|---|---|---|
| 2004/0242225 A1 | 12/2004 | Jincheng |
| 2006/0242695 A1 | 10/2006 | Plamen et al. |
| 2010/0291943 A1 | 11/2010 | Mihaly et al. |
| 2011/0090911 A1 | 4/2011 | Hao et al. |
| 2012/0173661 A1 | 7/2012 | Mahaffey et al. |
| 2012/0300615 A1 | 11/2012 | Kempf et al. |
| 2013/0054761 A1 | 2/2013 | Kempf et al. |

(Continued)

FOREIGN PATENT DOCUMENTS

| | | |
|---|---|---|
| CN | 1400843 A | 3/2003 |
| CN | 1921386 A | 2/2007 |

(Continued)

OTHER PUBLICATIONS

Baliga, A. et al., "VPMN—Virtual Private Mobile Network Towards Mobility-as-a-Service," Jun. 28, 2011, 5 pages.

(Continued)

*Primary Examiner* — Melvin C Marcelo
(74) *Attorney, Agent, or Firm* — Slater Matsil, LLP

(57) ABSTRACT

A method embodiment includes receiving, by a virtual user-specific service gateway (v-u-SGW) on a processor, a packet, processing the packet, and forwarding the packet to a user equipment (UE). The v-u-SGW is created in accordance with registration of the UE in a network. The method further includes processing the packet in accordance with a configuration of the UE and/or a configuration of the network.

20 Claims, 7 Drawing Sheets

(56) References Cited

U.S. PATENT DOCUMENTS

| | | |
|---|---|---|
| 2013/0121207 A1 | 5/2013 | Parker |
| 2014/0280968 A1 | 9/2014 | Lin et al. |
| 2014/0317293 A1 | 10/2014 | Shatzkamer |
| 2018/0084436 A1* | 3/2018 | Li .................. H04W 16/18 |

FOREIGN PATENT DOCUMENTS

| | | |
|---|---|---|
| CN | 101501663 A | 8/2009 |
| JP | 2011512715 A | 4/2011 |
| JP | 2013509090 A | 3/2013 |
| JP | 2014533476 A | 12/2014 |
| WO | 2010127441 A1 | 11/2010 |
| WO | 2013072245 A1 | 5/2013 |

OTHER PUBLICATIONS

Li, L. et al., "CellSDN: Software-Defined Cellular Networks," Apr. 30, 2012, 6 pages.

"Support for Local IP Access," Source: Motorola, Documents for: Approval, Agenda Item: 7.4.6, 7.4.7, Work Item/Release: EHNB/Release 9, 3GPP TSG SA WG2 Meeting #72, Mar. 30-Apr. 3, 2009, TD S2-091978, 5 pages.

* cited by examiner

SYSTEM AND METHOD FOR VIRTUAL USER-SPECIFIC SERVICE GATEWAYS

This application is a continuation of U.S. application Ser. No. 14/464,571, filed on Aug. 20, 2014, titled "System and Method for Virtual User-Specific Service Gateways" which application claims the benefit of U.S. Provisional Application No. 61/877,119, filed on Sep. 12, 2013, titled "System and Method for Virtual User-Specific Service Gateway," which applications are hereby incorporated herein by reference.

TECHNICAL FIELD

The present invention relates to a system and method for wireless communications, and, in particular embodiments, to systems and methods for virtual user-specific service gateways.

BACKGROUND

Current network architectures apply a one-size fit-all approach with respect to packet data network gateways (PGW), service gateways (SGW), base stations (BS), and the like. A current network SGW acts as an anchor point for all user equipment (UEs) in a certain geographic area. That is, any UE in the geographic area will be served by the network SGW controlling the area. A typical network SGW may have a fixed location and may be selected based solely on geographic network deployment and location of the UE in the network without regard to the UE's mobility characteristics. Furthermore, the SGW's functionality may be limited to being a mobility anchor point. Thus, traditional network SGWs lack flexibility of adapting to a user-specific mobility behavior and/or application-specific quality of experience (QoE)/quality of service (QoS) requirements. The fixed network architecture also lacks flexibility for adapting to dynamic radio access network (RAN) topology changes.

SUMMARY

These and other problems are generally solved or circumvented, and technical advantages are generally achieved, by preferred embodiments of the present invention which provides a system and method for virtual user-specific service gateways.

In accordance with an embodiment, a method includes receiving, by a virtual user-specific service gateway (v-u-SGW) on a processor, a packet, processing the packet, and forwarding the packet to a user equipment (UE). The v-u-SGW is created in accordance with registration of the UE in a network. The method further includes processing the packet in accordance with a configuration of the UE and/or a configuration of the network.

In accordance with another embodiment, a network entity includes a processor and a computer readable storage medium storing programming for execution by the processor. The programming includes instructions to create a virtual user-specific service gateway (v-u-SGW) in accordance with registration of a user equipment (UE) in a network and operate the v-u-SGW. The instructions to operate the v-u-SGW includes further instructions to receive a packet, process the packet, and forward the packet to the UE. Processing the packet is in accordance with a configuration of the UE and/or a configuration of the network.

In accordance with another embodiment, a method includes managing, by a network controller, creation of a virtual user-specific service gateway (v-u-SGW) at a first physical location in accordance with registration of a UE in a network. The method further includes configuring one or more functionalities provided by the v-u-SGW in accordance with a configuration of the UE and/or a configuration of the network.

In accordance with yet another embodiment, a network controller includes a processor and a computer readable storage medium storing programming for execution by the processor. The programming includes instructions to manage creation of a virtual user-specific service gateway (v-u-SGW) at a physical location in accordance with registration of a UE in a network and configure one or more functionalities provided by the v-u-SGW in accordance with a configuration of the UE and/or a configuration of the network.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely virtual user-specific service gateways for a cloud radio access network (CRAN). Various embodiments may also be applied, however, to a variety of different networks and network nodes.

Various embodiments provide one or more virtual user-specific service gateways (v-u-SGW) for user equipment (UEs) in a network. The v-u-SGW is a virtual software entity that may be specific to a particular UE or group of UEs. Each v-u-SGW may provide layer 3, layer 2, and/or layer 1 anchor point functionality for served UE(s). For example, for downlink transmissions, packets for the served UE may be forwarded from a transmission source to the v-u-SGW. Similarly, for uplink transmissions, the UE may pass packets to its serving v-u-SGW, which then forwards the uplink packets to the packet's destination. Thus, a v-u-SGW may act as an anchor point of a UE in the network. The v-u-SGW may further track any UE-specific configurations (e.g., quality of experience (QoE) requirements, quality of service requirements, and the like) and/or network configuration (e.g., network topology, network transmission schemes, network architecture, and the like). Based on UE and/or network configuration, the v-u-SGW may provide layer 3 through layer 1 anchor point functionalities, such as, application layer processing (e.g., based on quality of service (QoS) requirements of UE 102), gating functions, QoE control, virtual link activation, translation functions, joint transmission convergence functionality, and/or the like. A network controller may manage the creation, physical location selection, deletion, configuration, of the v-u-SGW. From a network point-of-view, the v-u-SGW may appear as a virtual UE or other virtual device, which may be relocated and reconfigured as desired based on the network status of service UE(s). Thus, various embodiments provide mechanisms to enable a customized data plane network topology and data processes that are UE-specific and dynamically configurable.

Figure 1A:
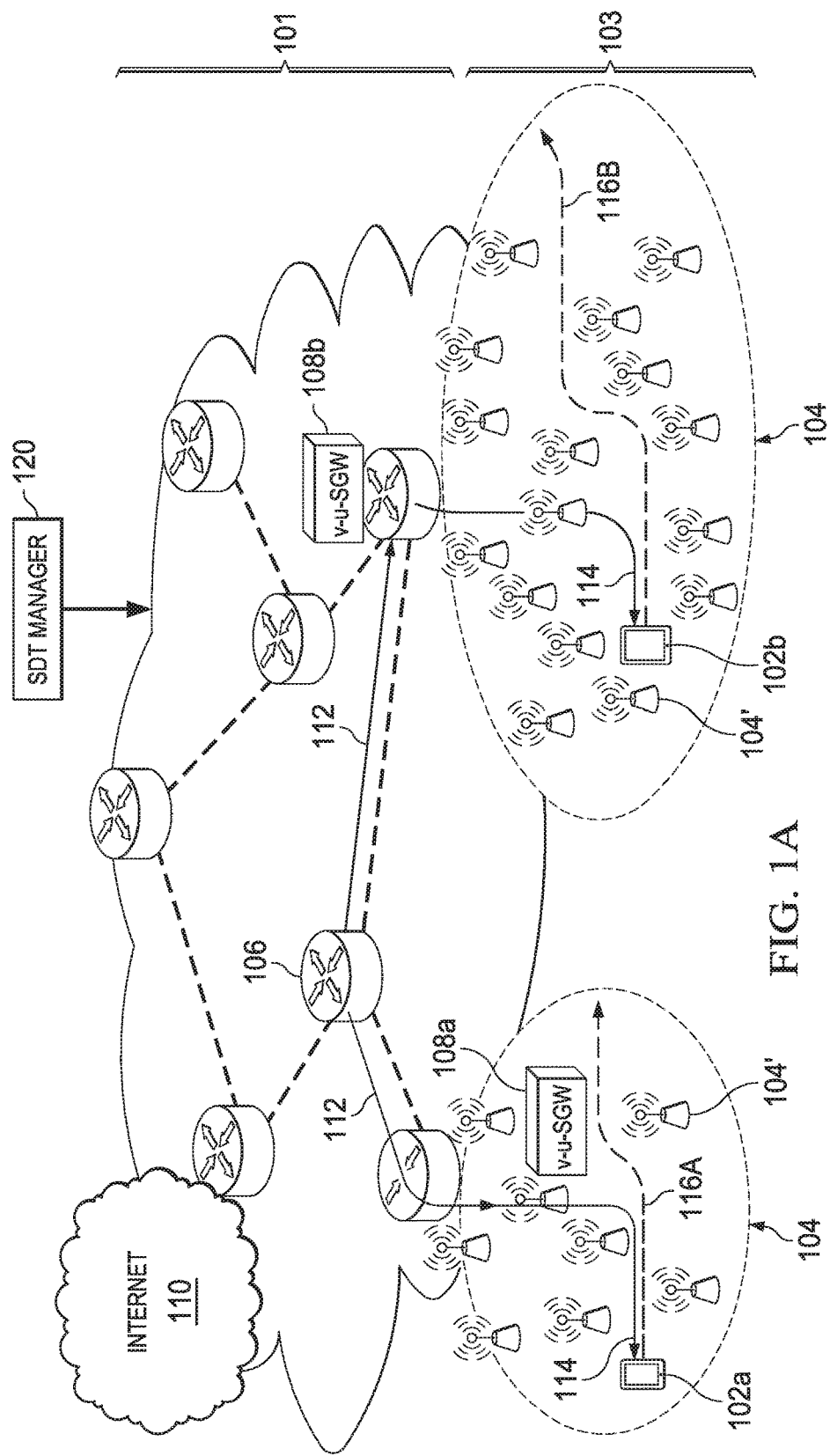
FIGS. 1A through 1C are a block diagrams of a network 100 having virtual user-specific service gateways in accordance with various embodiments.

FIG. 1 illustrates a network 100 in accordance with various embodiments. Network 100 includes user equipment (UEs) 102 and a plurality of CRAN clusters 104, which may include a plurality of densely-deployed operator radio nodes 104'. For example, in network 100, there may be a hundred or more low power radio nodes per $km^2$ in each CRAN cluster 104. Radio nodes in CRAN cluster 104 may be access networks (ANs) such as long term evolution (LTE) base stations (BS), universal mobile telecommunication system (UMTS) nodeBs/radio network controllers (RNCs), WiFi access points (APs), future ANs, combinations thereof, and the like, which provide access link functionality for end-user terminals, such as UEs 102. Furthermore, the radio nodes in CRAN clusters 104 may support communications in accordance with various communications standards such as code divisional multiple access (CDMA), LTE, Global Systems for Mobile Communications (GSM), Universal Mobile Telecommunications System (UMTS), future communications standards, combinations thereof, and the like. Each radio node may or may not be capable of communicating in accordance with more than one standard.

Radio nodes in CRAN clusters 104 may be adapted to provide access links to specific UEs 102, for example, based on geography, received channel conditions, and the like of a UE 102. In network 100 during downlink transmissions, data flow packets may be transmitted from a transmission source no (e.g., a UE, a datacenter, or the like) through to a virtual user-specific SGW (v-u-SGW) 108 serving the destination UE 102. Packets from transmission source no to v-u-SGW 108 may be transmitted through a network SGW 106, a v-u-SGW 108 associated with transmission source no, and the like. The v-u-SGW 108 processes the packet as desired, for example, providing layer 3, layer 2, and/or layer 1 functionality. The v-u-SGW 108 of a destination UE 102 may then forward the processed packet to an applicable radio node in CRAN cluster 104 for transmission to the destination UE 102. Uplink transmissions from UE 102 to the network may be conducted in a similar manner in reverse. Thus, v-u-SGWs 108 may operate as mobility and data plane anchor points for UEs 102. Network traffic for each UE 102 may first pass through its corresponding v-u-SGW 108 before being forwarded to the UE 102 (in downlink) or the packet's destination (in uplink).

The inclusion of v-u-SGWs 108 allows the network to be logically divided into at least two domains: core network domain 101 and local network domain 103. Core network domain 101 includes network resources (e.g., network SGWs 106 and/or radio nodes 104') that may be used to transmit data packets between the network (e.g., network SGWs 106 and/or other network entities) and a v-u-SGW 108. Local network domain 103 includes network resources (e.g., radio nodes 104') that may be used to transmit data packets between a v-u-SGW 108 and a served UE 102. For example, local network domain 103 may include the set of radio nodes geographically located within a certain range of UE 102 that may be available for transmissions to/from UE 102.

Resource management in network 100 may include allocating network resources in both the core network domain 101 (e.g., between network SGW 106 and v-u-SGW 108) and local network domain 103 (e.g., between v-u-SGW 108 and UE 102). The set of allocated resources (e.g., access links, backhaul links, and the like) for a particular service (e.g., transmissions between a UE and one or more other UEs) may be referred to as a virtual network. Forwarding paths (e.g., from a virtual network perspective) may be divided into multiple segments. For example, transmissions in network 100 may be divided into at least two forwarding segments. First forwarding segment 112 includes virtual network links (e.g., backhaul links) for transmitting a packet to/from the network (e.g., network SGW 106 and/or other network entities) and a v-u-SGW 108 in core network domain 101. Second forwarding segment 114 includes virtual network links (e.g., backhaul/access links) for transmitting a packet to/from the v-u-SGW 108 and a destination UE 102 (e.g., through one or more radio nodes in CRAN cluster 104) in local network domain 103.

Each v-u-SGW 108 is a software entity, which may be created upon registration of a UE 102 in network 100. Thus, each v-u-SGW 108 may be user-specific and correspond to a single UE 102. Alternatively, a v-u-SGW 108 may correspond to a group of UEs. For example, a v-u-SGW 108 may correspond to a group of UEs jointly transmitting/receiving data, a group of UEs on a bus, a group of UEs in a particular area, or the like. From a network point of view, v-u-SGW 108 may be treated as a virtual UE or similar virtual device. From an associated UE 102 (or group of UEs 102)'s point of view, v-u-SGW 108 is a service gateway that provides layer 3, layer 2, and/or layer 1 functionality and anchoring.

The functionality of v-u-SGW 108 (e.g., layers 3 through 1 functionality) may be dynamically configured by the network control plane based on UE configuration (e.g., QoE requirements, QoS requirements, operating mode, capabilities, and the like) and/or network configuration (e.g., network topology, network transmission schemes, network architecture, and the like). Furthermore, upon de-registration/powering off of UEs 102, corresponding v-u-SGWs 108 may also be removed/deactivated from network 100. Network 100 may include one or more controllers in a network control plane, such as a software defined topology (SDT) controller 120, for managing the creation, configuration (e.g., configuring provided functionality), migration, and deletion of v-u-SGWs 108 in accordance with UE 102 configuration (e.g., neighborhood relations, mobility patterns, QoE/QoS requirements, and the like) and/or network configuration (e.g., network topology, network transmission schemes, and the like).

v-u-SGWs 108 may be physically located at a radio node 104', a network SGW 106, or another network device in network 100. The selection of physical locations for v-u-SGWs 108 may depend on neighborhood relations (e.g., location, configuration of CRAN cluster 104, and the like), mobility, QoE requirements, and the like of its corresponding UE 102. For example, for relatively stationary or slow moving UEs (labeled as UEs 102a), the physical location of a corresponding v-u-SGW 108a may be located closer to a network edge. That is, v-u-SGW 108a may be located relatively close to UE 102a so that transmission paths in the local network domain between v-u-SGW 108a and UEs iota are relatively short. In contrast, for fast moving UEs (labeled as UE 102b), the physical location of a corresponding v-u-SGW 108b may be more centrally located in the network (e.g., at a network SGW 106 or a centrally-located radio node 104'). As fast moving UE 102b move in network 100 (as indicated by path 116), the location of v-u-SGW 108b may not require frequent updates due to its central location.

v-u-SGWs 108 act as anchor points that enable simpler resource management, for example, by a software defined radio access network-traffic engineering (SDRAN-TE) controller. In network 100, the major impact of UEs 102 mobility (especially fast moving UEs 102b) may confined to local network domain 103 because the position of v-u-SGWs 108 may be relatively constant. Therefore, forwarding segments 112 in core network domain 101 may not require frequent updates, and the dynamics of UE mobility may be relatively isolated from core network domain 101. That is, the allocation of resources for forwarding segment 112 may be updated on a less frequent basis than resource allocations in local network domain 103. As mobility anchor points, v-u-SGWs 108 may provide convergence points for packet transmissions that enables a more stable backhaul/core network. Furthermore, because v-u-SGWs 108 reduce the impact of UE mobility (and corresponding forwarding segment 112 updates), improved QoE and easier management of virtual network migration based on UE 102 movement may be provided.

Figure 1B:
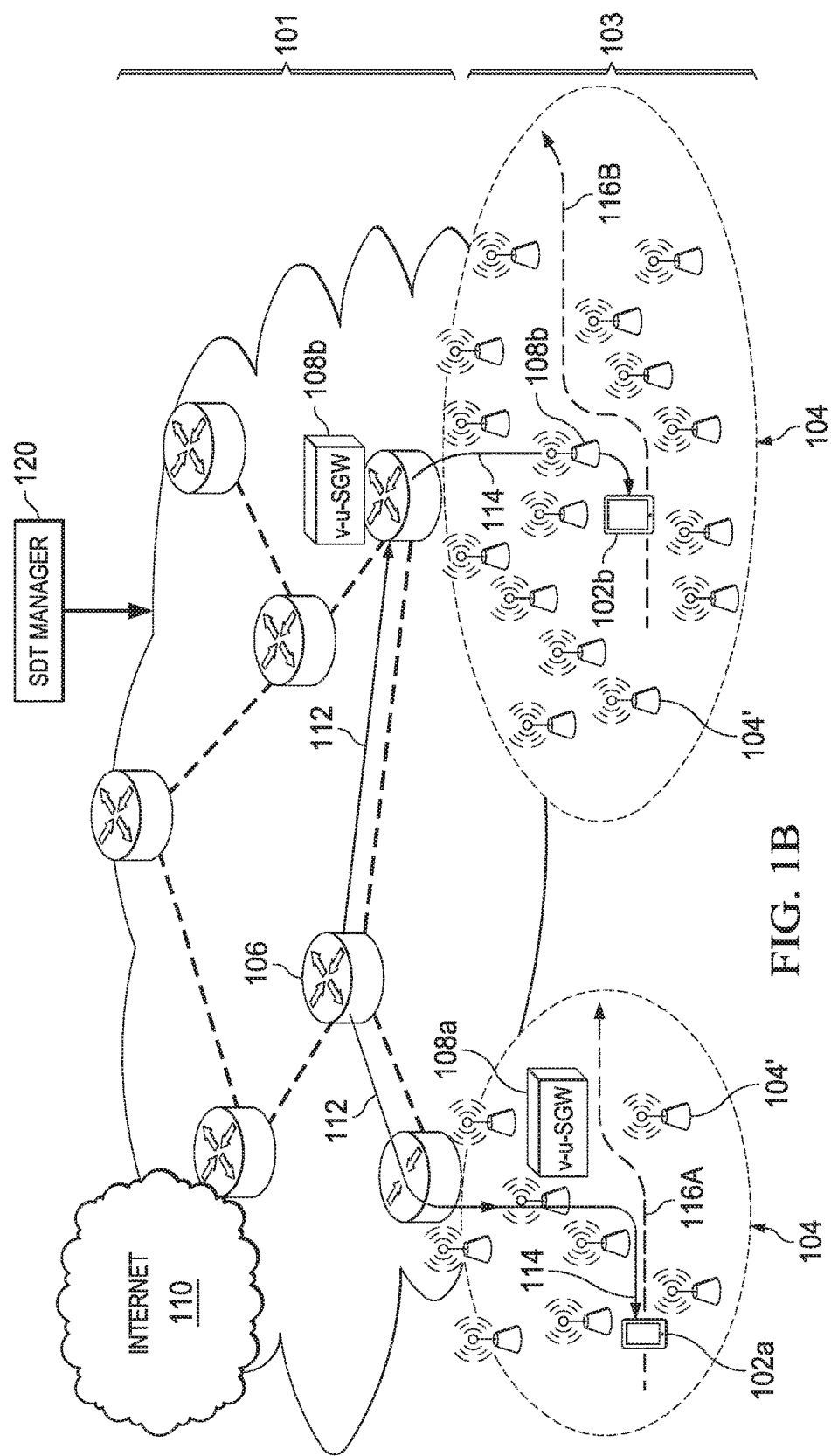

For example, FIG. 1B illustrates the movement of fast moving UE 102b to a different physical location in network 100, which may require reallocation of network resources (e.g., due to changes in neighborhood relations of UE 102b). Due to the location of v-u-SGW 108b, forwarding segment 112 in core network domain 101 may not require reconfiguring. Instead, only forwarding segment 114 in local network domain 103 may be updated, for example, by reallocating resources in local network domain 103 based on UE 102b's new location. Thus, in network 100, UE mobility may not trigger complete reconfiguration of forwarding paths in network 100 because forwarding segments 112 in core network domain 101 may remain relatively constant.

Figure 1C:
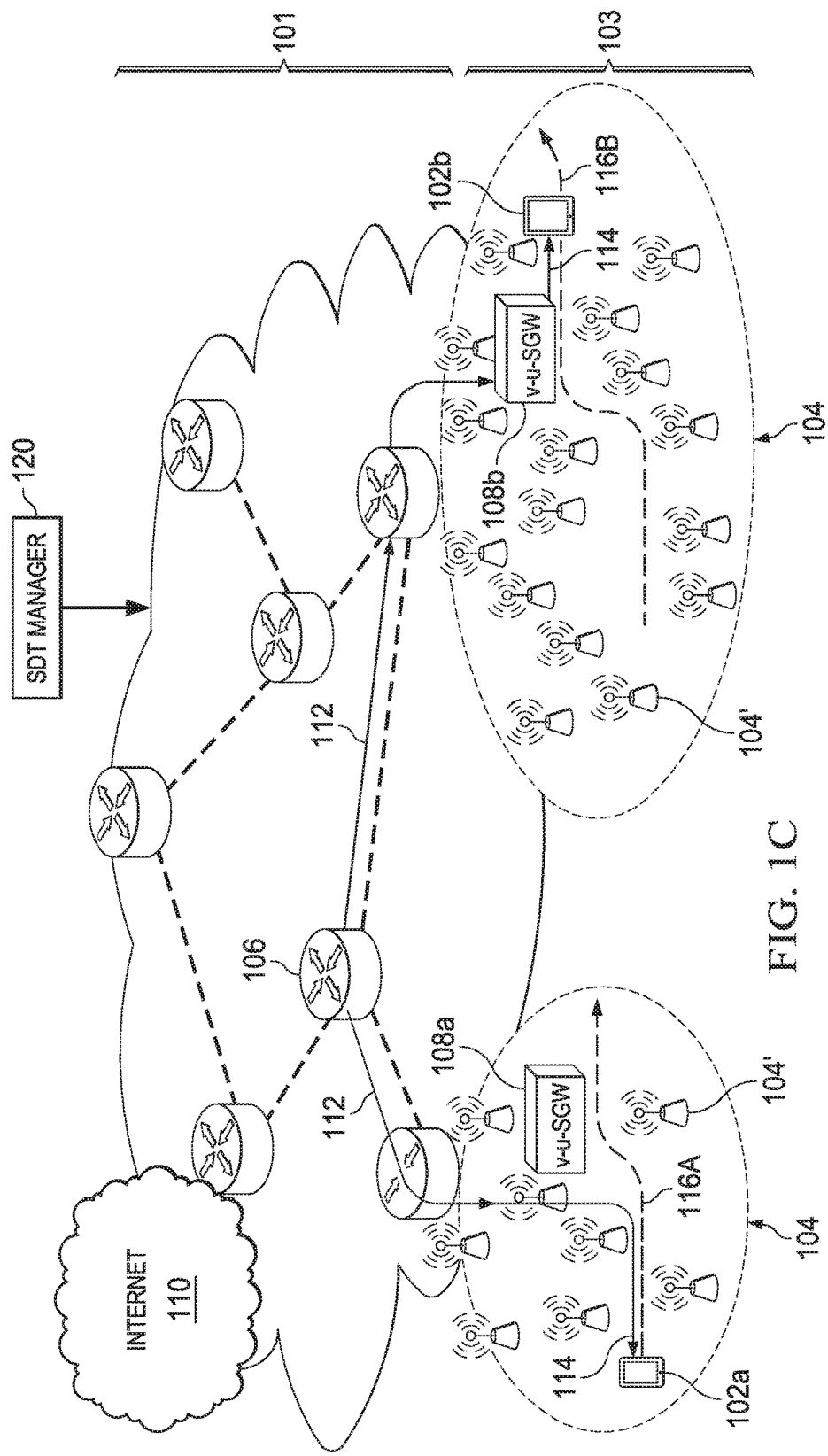

As the configuration of UEs 102 changes in network 100, the location of v-u-SGW 108 may also be updated accordingly. For example, when UE 102 moves outside an area controlled by the v-u-SGW 108, the location of v-u-SGW 108 may be updated accordingly, as illustrated by FIG. 1C. The new location of v-u-SGW 108 may also trigger reallocation of network resources in core network domain 101, and forwarding segments 112 may be updated accordingly. However, physical location updates to v-u-SGW 108 may generally occur on a less frequent basis than reallocation of resources in local network domain 103.

Figure 2:
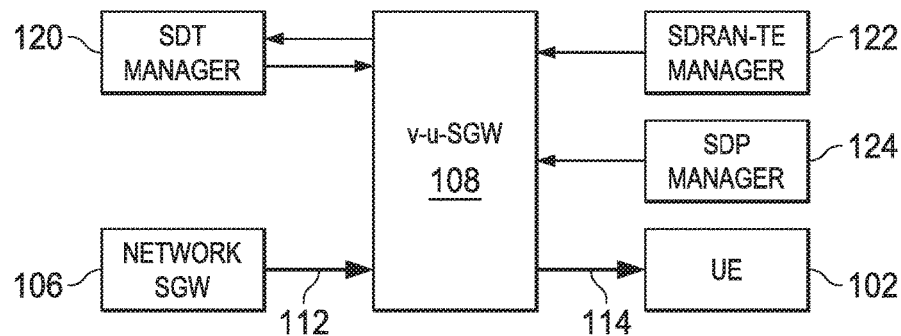
FIG. 2 is a block diagram of a virtual user-specific service gateway interacting with various network entities in accordance with various embodiments.

FIG. 2 illustrates a block diagram of a v-u-SGW 108 interacting with various network entities in network 100 in accordance with various embodiments. v-u-SGW 108 may interface with various entities in the network control plane of network 100. A SDT controller 120 manages the creation/deletion of v-u-SGW 108 based on UE 102 status (e.g., registration/de-registration). SDT controller 120 may also configure the functionality (e.g., layer 3 through layer 1 functionality) provided by v-u-SGW 108 based on UE configuration (e.g., QoE requirements, QoS requirements, operational mode, capabilities, and the like) and/or network configuration (e.g., network topology, network transmission schemes, network architecture, and the like). The functionality of all v-u-SGWs 108 in network 100 may vary. As part of functionality configuration, SDT controller 120 may provide any relevant security keys, a corresponding UE 102's network profile, and the like. Furthermore, as the UE 102's configuration changes (e.g., changes in location, mobility patterns, QoE requirements, and the like), SDT controller 120 may relocate and/or reconfigure v-u-SGW 108 based on the configuration changes.

v-u-SGW 108 may receive configurations from a SDRAN-TE controller 122 and/or a software defined protocol (SDP) controller 124. For example, v-u-SGW 108 may receive forwarding information base (FIB) entries from SDRAN-TE controller 122 and protocol information base (PIB) entries from SDP controller 124. FIB entries allow v-u-SGW 108 to determine forwarding paths for UE 102 (both uplink and downlink forwarding paths). The allocation of network resources for UE 102 may be triggered by v-u-SGW 108, for example, by signaling SDT controller 120.

v-u-SGW 108 may further interface with the network data plane of network 100, Packets for UE 102 are forwarded to v-u-SGW 108 from a network SGW 106 (or other network entity) via forwarding segment 112. v-u-SGW 108 may process packets, for example, according to configurations from the network control plane. Based on these configurations, v-u-SGW 108 may process packets for UE 102 accordingly. For example, v-u-SGW 108 may apply protocols to packets based on PIB entries from SDP controller 124. v-u-SGW 108 may further provide other functions relating to packets (e.g., layer 3 through layer 1 functionality) as will be explained in greater detail in subsequent paragraphs. v-u-SGW 108 may then forward the packet to UE 102 using forwarding segment 114 based on entries of the FIB. Uplink transmissions may be conducted in a similar manner in reverse.

v-u-SGW 108 may also interface with additional network entities not illustrated in FIG. 2. For example, when v-u-SGW 108 is unaware of a served UE 102's location (e.g., when UE 102 is in an energy saving mode), v-u-SGW 108 may trigger other network entities (e.g., a connectivity manager, radio nodes 104', or the like) to page UE 102 for determining its location information. v-u-SGW 108 may interface with other network entities as well depending on network and/or UE configuration.

Figure 3:
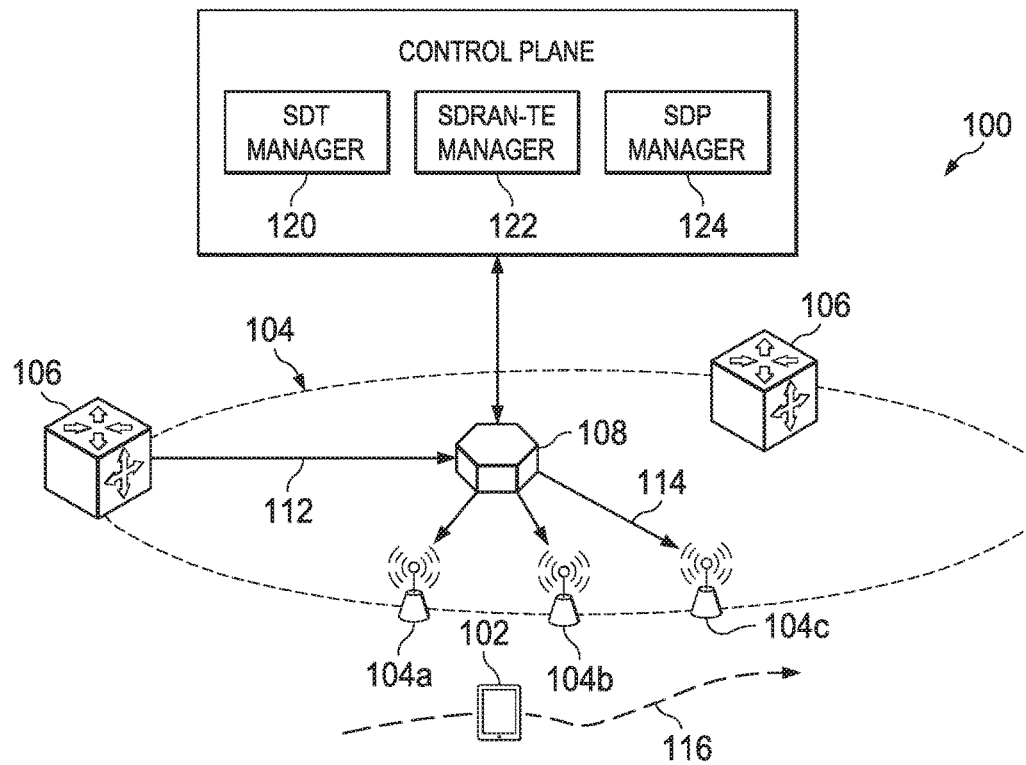
FIG. 3 illustrates a block diagram of a virtual user-specific service gateway providing layer 3 functionality in accordance with various embodiments.

FIG. 3 illustrates a block diagram v-u-SGW 108 as a layer 3 mobility anchor point and providing other layer 3 functionality in accordance with various embodiments. v-u-SGW 108 may be associated with a UE 102 (or a group of UEs 102). v-u-SGW 108 may be created/deleted upon UE 102 registration/de-registration in the network, and the physical location of v-u-SGW 108 may be selected/dynamically updated based on configuration (e.g., neighborhood relations, mobility, QoS requirements, and the like) of an associated UE 102.

In various embodiments, UE 102 may operate in one or more operational modes, such as, an active mode, an energy saving mode, or the like. For example, when UE 102 is in an energy saving mode, SDRAN-TE manager 122 may not allocate any dedicated resources for UE 102. In energy saving, network 100 may not include any virtual networks for UE 102. Or the virtual network allocation for UE 102 may be incomplete (e.g., dedicated resources may be allocated in core network domain 101 but not local network domain 103). Any packets for UE 102 during energy saving mode may be transmitted from a network SGW 106 (or other network entity) to v-u-SGW 108, which may directly transmit the packet to UE 102. v-u-SGW 108 may also monitor traffic to UE 102 during the energy saving mode and trigger the allocation of additional dedicated resources, for example, when network traffic exceeds a particular threshold. For example, for small packet transmissions (e.g., text messages, and the like), v-u-SGW 108 may directly transmit the packet to UE 102 without allocation of dedicated resources. In contrast, if v-u-SGW 108 detects a larger transmission (e.g., a video transmission), v-u-SGW 108 may trigger the creation of a virtual network (e.g., dedicated resource assignments) for UE 102.

Data flow packets may be transmitted to and/or received by UE 102 through v-u-SGW 108. For example, in downlink transmissions, network SGW 106 (or another network device) may transmit a packet for UE 102 to v-u-SGW 108 through forwarding segment 112 in core network domain 101. The location of v-u-SGW 108 may be selected based on configuration of UE 102. For example, for a high mobility UE 102, v-u-SGW 108 may be more centrally located in network 100. As another example, for low mobility UEs 102, v-u-SGW 108 may be located closer to the UE 102 to provide shorter forwarding paths in local network domain 103 (e.g., forwarding segment 114). v-u-SGW 108 may forward the packet to one or more radio nodes 104' associated with UE 102 using forwarding segments 114 in local network domain 103. As UE 102 moves in network 100 (as illustrated by arrow 116), UE 102 may be associated with various different radio nodes 104' at different transmission time intervals (TTIs). v-u-SGW 108 may determine which radio node 104' to transmit a packet to based on entries in a FIB as configured by the network control plane (e.g., SDRAN-TE controller 122). v-u-SGW 108 may further trigger the creation of a virtual network for UE 102 (e.g., resource allocation in both core network domain 101 and local network domain 103) as necessary by signaling the network control plane (e.g., SDT controller 120).

In uplink transmissions, v-u-SGW 108 may receive transmissions from UE 102 (e.g., through forwarding segments 114) and forward the uplink packets to network SGW 106 (or another network device) using forwarding segment 112. v-u-SGW 108 may determine which transmission forwarding paths to use in segment 112 based on entries in a FIB as configured by SDRAN-TE controller 122. v-u-SGW 108 may further trigger the creation of a virtual network as necessary by signaling SDT controller 120.

Upon receipt of the packet (e.g., either during uplink or downlink), v-u-SGW 108 may process the packet to provide layer 3 functionality before passing the packet to the packet's destination. The functionality provided may be configured by the network control plane (e.g., by SDT controller 120/SDP controller 124) in accordance with UE 102 configuration and/or network configuration. Provided functionalities may include any upper layer processes. For example, v-u-SGW 108 may apply protocols to the packet as configured by SDP controller 124. In networks where network IDs (e.g., data flow IDs/service ID/virtual network ID), naming convention, and the like of forwarding segments 112 and 114 differ, v-u-SGW 108 may process packets to have the correct network ID/naming convention. v-u-SGW 108 may also provide other upper layer processes such as QoE control (e.g., by dropping packets that do not pass a QoE threshold), gating functionality (e.g., by dropping unwanted packets such as ads, blocked content, and the like), provide application layer processes (e.g., transcoding/layer coding packets for application services based on a QoS requirements), security functions (e.g., dropping packets that do not pass various security checks, access/security key maintenance for UE 102, and the like), packet classification, trigger paging, user domain name mapping for frequently accessed domains, transport protocol translation (e.g., when transport protocols in the local domain and core domains of the virtual network are different), and the like.

Figure 4:
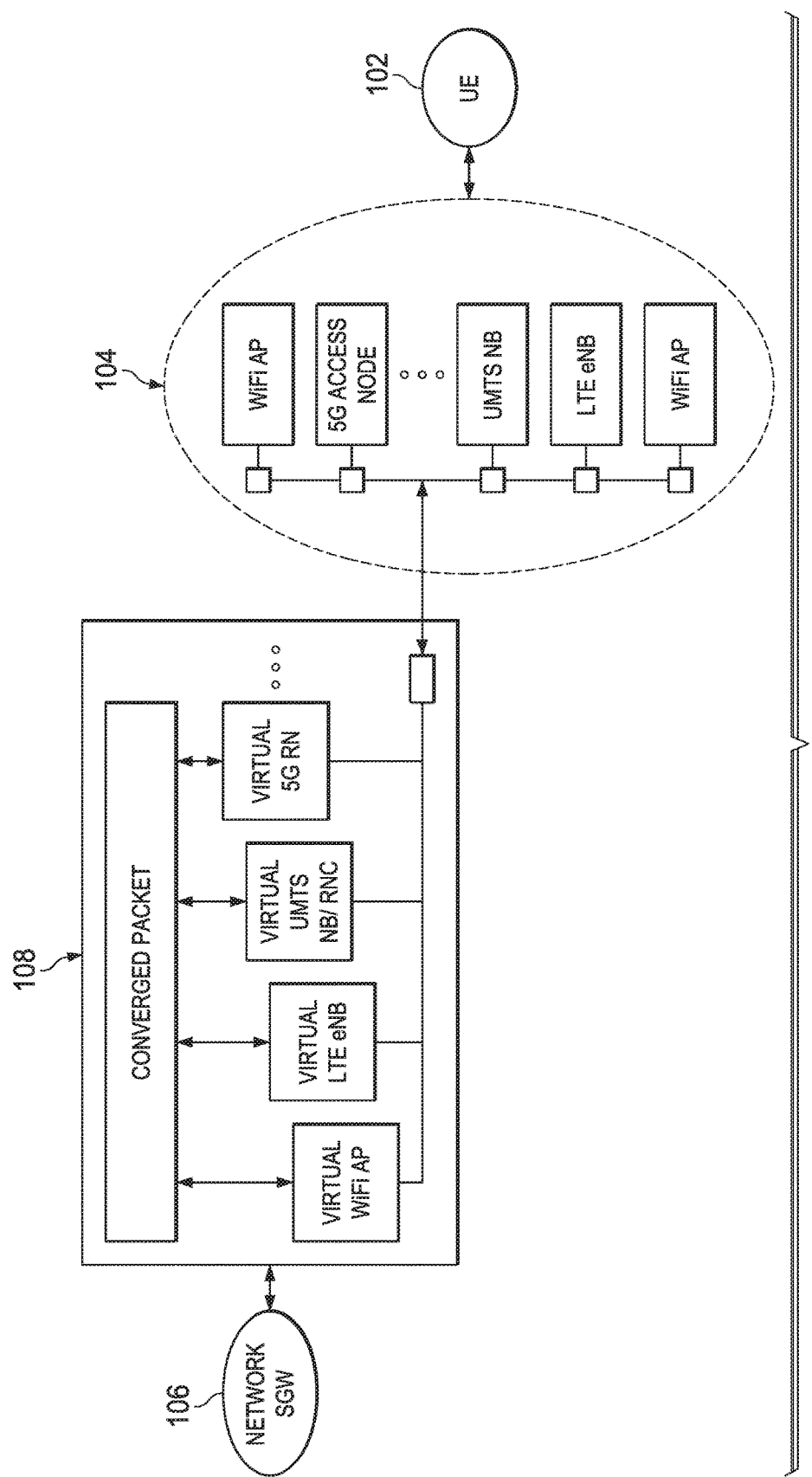
FIG. 4 illustrates a block diagram of a virtual user-specific service gateway providing layer 2 functionality in accordance with various embodiments.

In addition to upper layer functionality, v-u-SGW 108 may also provide layer 2 functionality. For example, FIG. 4 illustrates a block diagram of v-u-SGW 108 as a layer 2 anchor point. As previously discussed, radio nodes 104' in CRAN clusters 104 may communicate in accordance with multiple communication standards. In such embodiments, SDT controller 120 may configure v-u-SGW 108 to provide layer 2 translation functionality. For example, radio nodes in CRAN cluster 104 may include various access networks such as WiFi APs, LTE eNodeBs, UMTS nodeBs/RNCs, future 5G radio nodes, and the like. Packet formats and protocols may vary depending on which radio node(s) 104' a UE 102 is associated with. Thus, the configuration of uplink/downlink transmissions for UE 102 may vary, and v-u-SGW 108 may act as a layer 2 anchor point by translating packets between network SGW and radio nodes 104'. For example, for downlink transmissions, v-u-SGW 108 may process packets from network SGW and convert the packets from a converged packet format (e.g., used by network 100) to a format suitable for the radio node(s) associated with the destination UE 102. The converged packet format may be in accordance with any suitable standard (e.g., LTE, WiFi, UMTS, or the like) or a proprietary format used by network 100. During uplink transmissions, v-u-SGW 108 may convert packets received from radio nodes in CRAN cluster 104 (e.g., LTE, WiFi, UMTS, or the like) into the converged packet format before passing the packet to network SGW 106. Thus, in some embodiments, v-u-SGW 108 may act as a convergence point for various standards of communications and provide layer 2 translation/processing functionality for UE 102.

Figure 5:
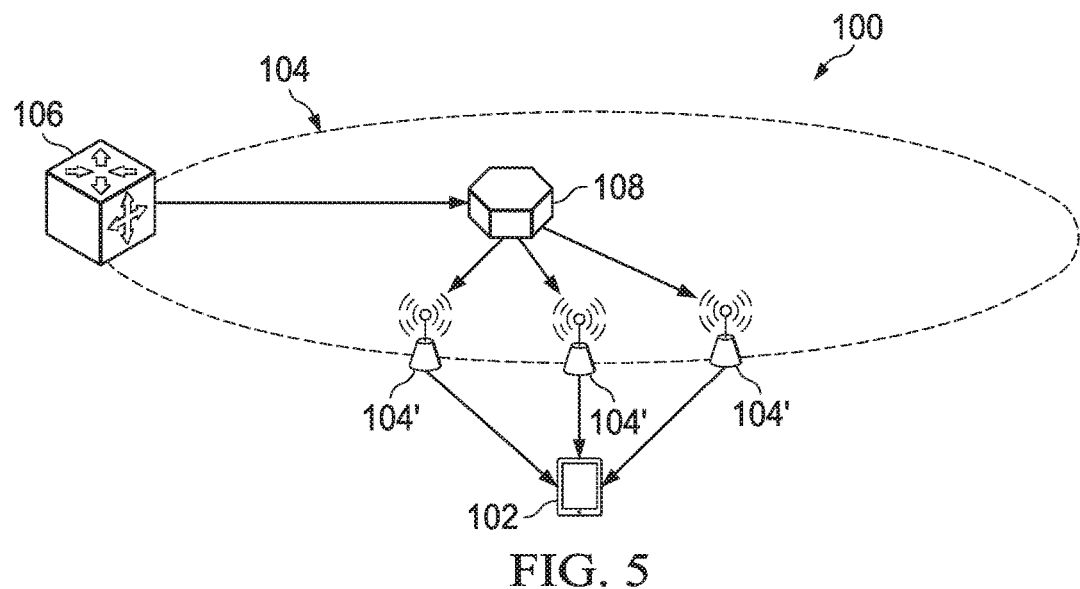
FIG. 5 illustrates a block diagram of a virtual user-specific service gateway providing layer 1 functionality in accordance with various embodiments.

In addition to upper layer functionality and layer 2 functionality, v-u-SGW 108 may also provide layer 1 functionality. For example, FIG. 5 illustrates a block diagram of v-u-SGW 108 as a layer 1 anchor point. In network 100, radio nodes 104' in CRAN cluster 104 may jointly communicate with UE 102 in a joint transmission/reception scheme. Furthermore, UEs 102 may also jointly communicate with one or more radio nodes 104'. For example, radio nodes 104' may form a virtual transceiver, which cooperatively communicates with radio node 104'. Other forms of joint transmission/reception between multiple radio nodes 104' and UE 102 may also be used. In such embodiments, SDT controller 120 may configure v-u-SGW 108 to provide layer 1 anchoring for the joint transmission/reception transmission scheme. For example, for downlink transmissions, v-u-SGW 108 may pre-code packets in accordance with a joint transmission mode before forwarding packets to radio nodes 104' for joint transmission. In uplink transmissions, v-u-SGW 108 may perform packet selection (e.g., in cases where duplicate packets are received), joint processing/interference cancellation, and the like for jointly received uplink packets before forwarding the packets to network SGW 106 (or the destination of the packet, another v-u-SGW, or the like). Thus, v-u-SGW 108 may provide layer 1 anchor point functionality for downlink transmissions/uplink reception for joint communication schemes involving multiple radio nodes 104'.

Figure 6:
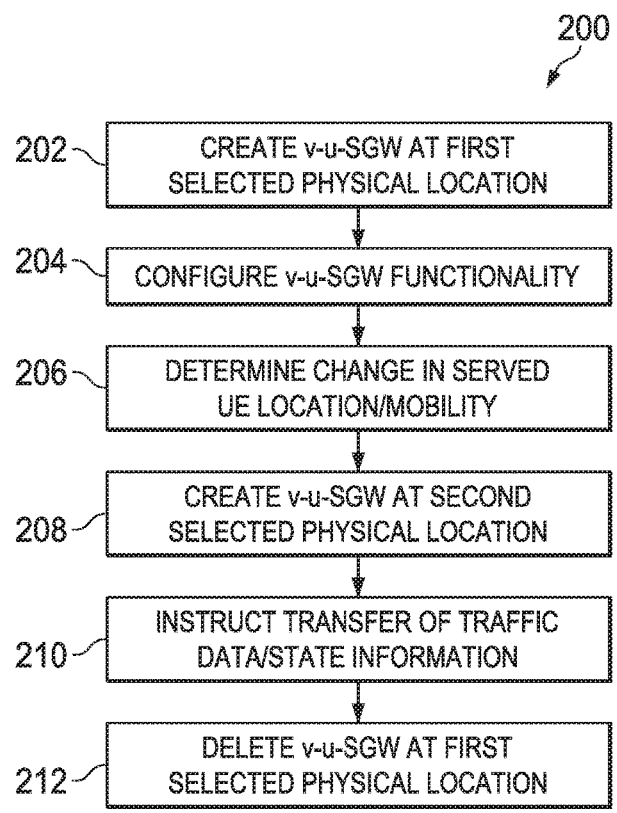
FIG. 6 illustrates a process flow diagram network controller operations in accordance with various embodiments.

FIG. 6 illustrates a process flow 200 for network controller operations in accordance with various embodiments. In step 202, a SDT controller 120 or similar network device creates a v-u-SGW 108 at a first selected physical location (e.g., a radio node 104', or the like), for example, based on a UE 102's registration in the network. The first location of v-u-SGW 108 may be selected based on UE 102's neighborhood relations, mobility, QoE requirements, and/or the like. For example, for a relatively stationary/slow moving UE 102, SDT controller 120 may locate v-u-SGW 108 at a network edge location (e.g., close to UE 102). As another example, for a relatively fast moving UE 102, SDT controller may choose a network central location for v-u-SGW 108. Next in step 204, SDT controller 120 may configure the functionality (e.g., layer 3, layer 2, and/or layer 1 functionality) provided by v-u-SGW 108. The configured functionality may be based on UE configuration (e.g., QoE requirements, QoS requirements, capabilities, operation mode, and the like) and/or network configuration (e.g., network topology, network architecture, network transmission scheme, and the like).

In step 206, SDT controller 120 determines a change in UE location/mobility/QoE/or the like. For example, SDT controller 120 may receive an update on UE 102's location/mobility from a connectivity manager (e.g., a virtual user-specific connectivity manager, a network connectivity manager, or similar network entity) that monitors UE 102's location, mobility patterns, and the like. Based on this change, SDT controller 120 may decide to move v-u-SGW 108 accordingly. For example, SDT controller 120 may determine a second physical location for v-u-SGW 108 that is better suited for UE 102's new location, mobility pattern, and the like.

In step 208, SDT controller 120 creates a new v-u-SGW 108 for UE 102 in the selected second physical location. In step 210, SDT controller 120 instructs the v-u-SGW 108 at the first physical location to transfer any traffic data, UE 102 state information, and the like to the new location. Next, in step 212, SDT controller 120 may delete the v-u-SGW 108 at the first physical location. Thus, the location of the v-u-SGW associated with the UE 102 is moved to a second physical location based on a change in UE 102's location, mobility, and the like.

Figure 7A:
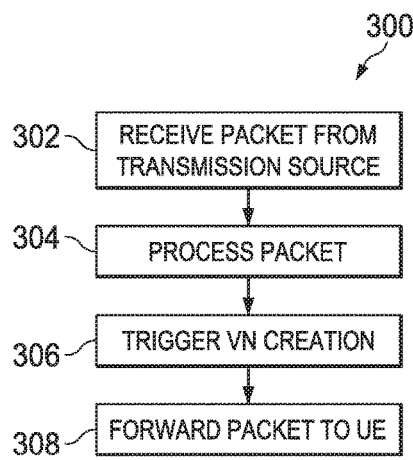
FIGS. 7A and 7B illustrate process flow diagrams of virtual user-specific service gateway operation during downlink and uplink in accordance with various embodiments.

FIG. 7A illustrates a process flow 300 of v-u-SGW 108 activity during downlink transmissions. In step 302, the v-u-SGW 108 receives a data flow packet from a transmission source. The packet may be sent from the transmission source through a network SGW 106, a v-u-SGW 108 associated with the transmission source, or another network entity. The network SGW may transfer the data flow packet using forwarding paths that are part of a core network domain 101 (e.g., forwarding segment 112). The core network domain may be relatively static regardless of UE mobility patterns. In step 304, the v-u-SGW may process the packet, for example, providing layer 3, layer 2, and/or layer 1 functionality. For example, v-u-SGW may perform gating functions, security control functions, verifying QoE of a packet, packet ID translation, packet naming convention translation, packet reformatting (e.g., converting from a converged packet format to a format compatible with a radio node associated with the UE), apply applicable protocols to the packet (e.g., as directed by a PIB configured by SDP controller 124), apply application layer processing, pre-coding of packets for joint transmission, protocol translation, and the like. v-u-SGW 108 may provide all of the above functionalities or a subset of these functions. The functionality provided by v-u-SGW 108 may be configured by the network control plane, for example, based on network configuration and/or UE 102 configuration.

After processing, in step 308, v-u-SGW 108 forwards the packet to the destination UE 102, for example, using a local network domain 103 (e.g., forwarding segment 114). Forwarding the packet may include forwarding the packet through one or more radio nodes 104' to destination UE 102. v-u-SGW 108 may determine the forwarding paths of the packet based on entries in a FIB configured by SDRAN-TE controller 122. Furthermore, v-u-SGW 108 may trigger creation of a virtual network (e.g., by configuring backhaul and/or access links) as necessary in the core network domain 101 (e.g., between network SGW 106 and v-u-SGW 108) and/or the local network domain 103 (e.g., between v-u-SGW 108 and UE 102). Thus, forwarding segments in the network may be dynamically updated, for example, based on UE movement, location, network status, and the like.

Figure 7B:
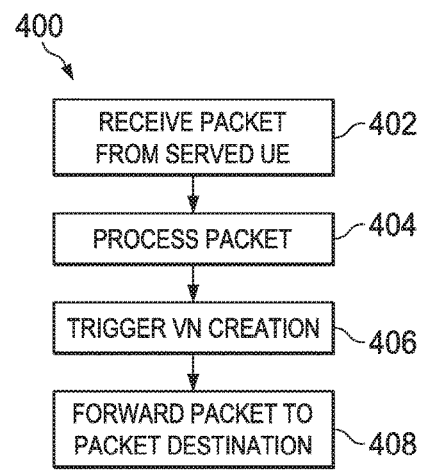

FIG. 7B illustrates a process flow 400 of v-u-SGW 108 activity during uplink transmissions. In step 402, the v-u-SGW 108 receives a data flow packet from an associated UE 102. The network SGW may transfer the data flow packet using forwarding paths that are part of a local network domain 103 (e.g., forwarding segment 114). The forwarding segments in the local network domain may be dynamically updated based on UE 102 movement, and the like. In step 404, the v-u-SGW may process the packet, for example, providing layer 3, layer 2, and/or layer 1 functionality. For example, v-u-SGW may perform packet reformatting (e.g., converting from a converged packet format to a format compatible with a radio node associated with the UE), QoE checking, applying protocols to the packet (e.g., as directed by a PIB configured by SDP controller 124), packet joint processing/interference cancellation for joint transmissions, QoS verification of a packet, protocol translation, and the like. v-u-SGW 108 may provide all of the above functionalities or a subset of these functions. The functionality provided by v-u-SGW 108 may be configured by the network control plane (e.g., an SDT controller 12) based on network configuration and/or UE 102 configuration.

After processing, in step 408, v-u-SGW 108 forwards the packet to the packet's destination. v-u-SGW 108 may forward the packet to its destination through a network SGW 106 for example, using the core network domain (e.g., forwarding segment 112). Alternatively, v-u-SGW 108 may forward the packet directly to the packet's destination (e.g., a destination UE), through a v-u-SGW associated with a destination UE, and the like. v-u-SGW 108 may determining the forwarding path of the packet based on entries in a FIB configured by the network control plane (e.g., SDRAN-TE controller 122). Furthermore, v-u-SGW 108 may trigger creation of a virtual network as necessary (e.g., in both the core network domain 101 and the local network domain 103) by signaling the network control plane (e.g., SDT controller 120).

Thus, a v-u-SGW may be tailored to provide functionalities based on an associated UE's QoE requirements, network configuration, and the like. The v-u-SGW may be created and dynamically updated based on UE location, movement, QoE requirements, and the like. Furthermore, the v-u-SGW may operate as an anchor point for layer 3, layer 2, and/or layer 1 functionality. The location of v-u-SGW may be selected so that at least a portion of forwarding paths for a UE remains relatively static regardless of the mobility characteristic of the UE, for example, by dividing network resources into a core network domain and a local network domain. Access/backhaul links (e.g., assigned network resources of a virtual network) in the local network domain may be updated on a more frequent basis than network links in the core network domain. v-u-SGW enables improved QoE, simplifies resource management, enables a more stable virtual network, enables dynamic user-specific data plane network topology and/or user-specific data processing, and the like.

Figure 8:
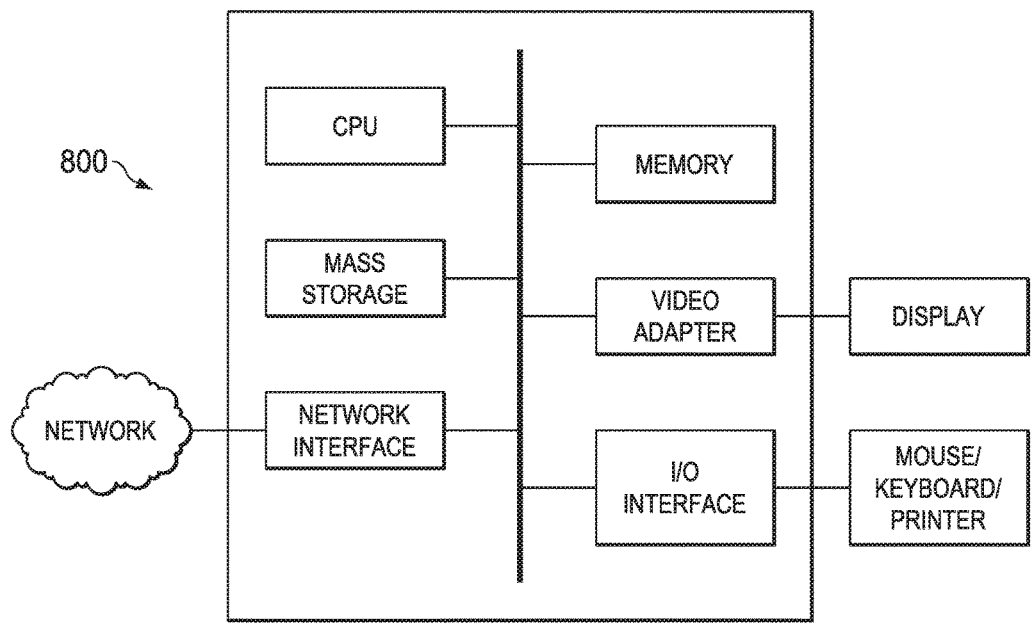
FIG. 8 illustrates a computing platform that may be used for implementing, for example, the devices and methods described herein, in accordance with an embodiment.

FIG. 8 is a block diagram of a processing system 60o that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, for execution at a software defined topology (SDT), controller, the method comprising:
   creating a first virtual gateway at a first selected location;
   configuring the first virtual gateway in accordance with a configuration associated with a user equipment (UE);
   creating a second virtual gateway at a second selected location; and
   transmitting an instruction, to the first virtual gateway, to transmit state information to the second virtual gateway.

2. The method of claim 1, wherein the virtual gateway is a virtual user-specific serving gateway.

3. The method of claim 1, wherein the step of creating the first virtual gateway includes creating the first virtual gateway upon registration of the UE.

4. The method of claim 1, further including configuring at least one of the first and second virtual gateways as a mobility anchor associated with the UE.

5. The method of claim 1, wherein configuring the first virtual gateway comprises configuring the first virtual gateway in accordance with a configuration associated with the UE and a network configuration.

6. The method of claim 5, wherein the network configuration includes at least one of a network topology, a network transmission scheme, and a network architecture.

7. The method of claim 1, wherein the configuration associated with the UE comprises at least one of a Quality of Experience requirement, a Quality of Service requirement, and operating mode, and capabilities of the UE.

8. The method of claim 1, wherein at least one of the first selected location and the second selected location is selected in accordance with one of neighborhood relations, mobility of the UE, and quality of experience requirements.

9. The method of claim 1, wherein the step of creating the second virtual gateway is performed responsive to a determination of a change in one of a UE location, a UE mobility and a quality of experience associated with the UE.

10. The method of claim 1, further comprising deleting the first virtual gateway from the first selected location.

11. A software defined topology controller comprising:
   a network interface;
   a processor; and
   a memory for storing instructions that when executed by the processor cause the software defined topology controller to be configured to:
   transmit instructions over the network interface to create a first virtual gateway at a first selected location;
   transmit configuration parameters over the network interface to the first virtual gateway in accordance with a configuration associated with a user equipment (UE);
   transmit instructions over the network interface to create a second virtual gateway at a second selected location; and
   transmit an instruction, to the first virtual gateway over the network interface, instructing the first virtual gateway to transmit state information to the second virtual gateway.

12. The software defined topology controller of claim 11 wherein the memory stores instructions to transmit instructions to create a first virtual gateway in response to a registration of the UE.

13. The software defined topology controller of claim 11, wherein the memory stores instructions to configure at least one of the first and second virtual gateways as a mobility anchor associated with the UE.

14. The software defined topology controller of claim 11, wherein the memory stores instructions to perform the step of creating the second virtual gateway responsive to a determination of a change in one of a UE location, a UE mobility and a quality of experience associated with the UE.

15. The software defined topology controller of claim 11, wherein the memory stores instructions to delete the first virtual gateway from the first selected location.

16. A non-transitory computer-readable medium storing computer instructions for execution at a software defined topology (SDT), controller, that when executed by one or more processors, cause the one or more processors to:
create a first virtual gateway at a first selected location;
configure the first virtual gateway in accordance with a configuration associated with a user equipment(UE);
create a second virtual gateway at a second selected location; and
transmit an instruction, to the first virtual gateway, to transmit state information to the second virtual gateway.

17. The non-transitory computer-readable medium of claim 16 wherein the non-transitory computer-readable medium stores instructions to transmit instructions to create a first virtual gateway in response to a registration of the UE.

18. The non-transitory computer-readable medium of claim 16, wherein the non-transitory computer-readable medium stores instructions to configure at least one of the first and second virtual gateways as a mobility anchor associated with the UE.

19. The non-transitory computer-readable medium of claim 16, wherein the non-transitory computer-readable medium stores instructions to perform the step of creating the second virtual gateway responsive to a determination of a change in one of a UE location, a UE mobility and a quality of experience associated with the UE.

20. The non-transitory computer-readable medium of claim 16, wherein the non-transitory computer-readable medium stores instructions to delete the first virtual gateway from the first selected location.

* * * * *

UNITED STATES PATENT AND TRADEMARK OFFICE
CERTIFICATE OF CORRECTION

PATENT NO. : 10,257,777 B2  
APPLICATION NO. : 15/914569  
DATED : April 9, 2019  
INVENTOR(S) : Hang Zhang Page 1 of 1

It is certified that error appears in the above-identified patent and that said Letters Patent is hereby corrected as shown below:

In the Claims

In Column 12, Line 21, Claim 2, delete "the virtual gateway" and insert --the first virtual gateway--.

Signed and Sealed this  
Twenty-fifth Day of June, 2019

Andrei Iancu  
*Director of the United States Patent and Trademark Office*